US012724835B2

(12) United States Patent
Ye et al.

(10) Patent No.: US 12,724,835 B2
(45) Date of Patent: Sep. 1, 2026

(54) METHOD AND SYSTEM FOR WEBPAGE CLASSIFICATION AND CONTENT DELIVERY

(71) Applicant: YAHOO ASSETS LLC, New York, NY (US)

(72) Inventors: Eric Ye, San Jose, CA (US); Xiao Bai, San Jose, CA (US); Neil O'Hare, San Francisco, CA (US); Eliyar Asgarieh, San Jose, CA (US); Kapil Thadani, New York, NY (US); Francisco Perez-Sorrosal, San Francisco, CA (US); Sujyothi Adiga, Bangalore (IN)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/365,941

(22) Filed: Aug. 4, 2023

(65) Prior Publication Data

US 2024/0045911 A1 Feb. 8, 2024

Related U.S. Application Data

(60) Provisional application No. 63/370,624, filed on Aug. 5, 2022.

(51) Int. Cl.
*G06F 16/951* (2019.01)
*G06F 16/955* (2019.01)
*G06F 16/958* (2019.01)

(52) U.S. Cl.
CPC ........ *G06F 16/951* (2019.01); *G06F 16/9566* (2019.01); *G06F 16/958* (2019.01)

(58) Field of Classification Search
None
See application file for complete search history.

(56) References Cited

U.S. PATENT DOCUMENTS

| | | | | |
|---|---|---|---|---|
| 2003/0149694 A1* | 8/2003 | Ma | G06F 16/951 | 707/999.009 |
| 2008/0262931 A1* | 10/2008 | Chan | G06Q 30/0277 | 705/14.4 |
| 2010/0010940 A1* | 1/2010 | Spyropoulos | G06F 18/256 | 706/54 |
| 2011/0258152 A1* | 10/2011 | Wang | G06F 16/35 | 706/12 |
| 2012/0010927 A1* | 1/2012 | Attenberg | G06F 16/95 | 705/14.4 |
| 2014/0033307 A1* | 1/2014 | Schmidtler | H04L 63/1483 | 726/22 |
| 2019/0205748 A1* | 7/2019 | Fukuda | G06N 3/044 | |

* cited by examiner

*Primary Examiner* — Kannan Shanmugasundaram
(74) *Attorney, Agent, or Firm* — James J. DeCarlo; Greenberg Traurig, LLP

(57) ABSTRACT

In some aspects, the techniques described herein relate to a method including: receiving, at a processor, an uncrawled URL corresponding to a webpage; applying, by the processor, a webpage classification model to the uncrawled URL to determine a probability for a plurality of webpage classifications; assigning, by the processor, one or more labels to the uncrawled URL corresponding to one or more classifications of the plurality of webpage classifications that meet a threshold; and providing, by the processor, a content item to be displayed on the webpage based on the one or more labels.

20 Claims, 11 Drawing Sheets

METHOD AND SYSTEM FOR WEBPAGE CLASSIFICATION AND CONTENT DELIVERY

CROSS-REFERENCE TO RELATED APPLICATIONS

This application claims the benefit of priority from U.S. Provisional Patent Application Ser. No. 63/370,624, filed Aug. 5, 2022, which is incorporated by reference in its entirety.

BACKGROUND

Generally, targeted content systems track users across websites using cookies. As content providers and users move toward a cookie-less world, the ability to track users' online activities for behavior targeting will be drastically reduced. Additionally, due to regulations such as GDPR and CCPA along with general privacy concerns, other techniques to track historical user behavior for content targeting purposes will become obsolete. For example, it is no longer possible to serve targeted content through audience targeting (e.g., demographic, behavioral) to users who have opted out of tracking.

Techniques in the art have attempted to circumvent these issues by relying on contextual targeting. Contextual targeting is content delivery strategy that displays content relevant to the content of a web page. Some of types of contextual targeting are category-based targeting, where content is targeted to webpages that are relevant to some predefined topics, and keyword-based targeting, where content is targeted to web pages containing specific keywords. Category-based contextual targeting provides for targeted content delivery to webpages that are relevant to content creator-targeted categories, according to a predefined taxonomy that reflect user interests. Further, contextual targeting provides for the delivery of a personalized content experience to users without tracking their identities (e.g., browser cookies, mobile device ids).

However, category-based targeting relies heavily on accurate webpage classification for precise content delivery. Traditional approaches in the art for webpage classification require massive amounts of computational and financial resources in order to accurately classify an ever increasing corpus of webpages.

Typical categories for contextual targeting should be broad enough to apply to divers e web pages, but specific enough to capture meaningful user interests. One approach is a tree-structured taxonomy, with specific or niche interests grouped under more general ones. For example, a hierarchical taxonomy can contain 442 interest categories: 12 tier-1 categories, 100 tier-2 categories, 259 tier-3 categories, 66 tier-4 categories and 5 tier-5 categories. In this structure, a web page assigned to any category (e.g., "Content & Entertainment/News") could also be categorized to its ancestor categories (e.g., "Content & Entertainment"). A page can also be described by multiple categories (e.g., a car blog by "Automotive" and "Content & Entertainment/News").

Additionally, in some targeted content delivery systems, content creators bid on which pages they would like to display their content. Content creators may send their bids along with the Uniform Resource Locators (URLs) of the pages on which content may be displayed. While using the full page content can lead to higher classification accuracy, accessing page content to enable prediction at request time may not meet performance requirements of service-level agreements (SLA) of content delivery systems.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
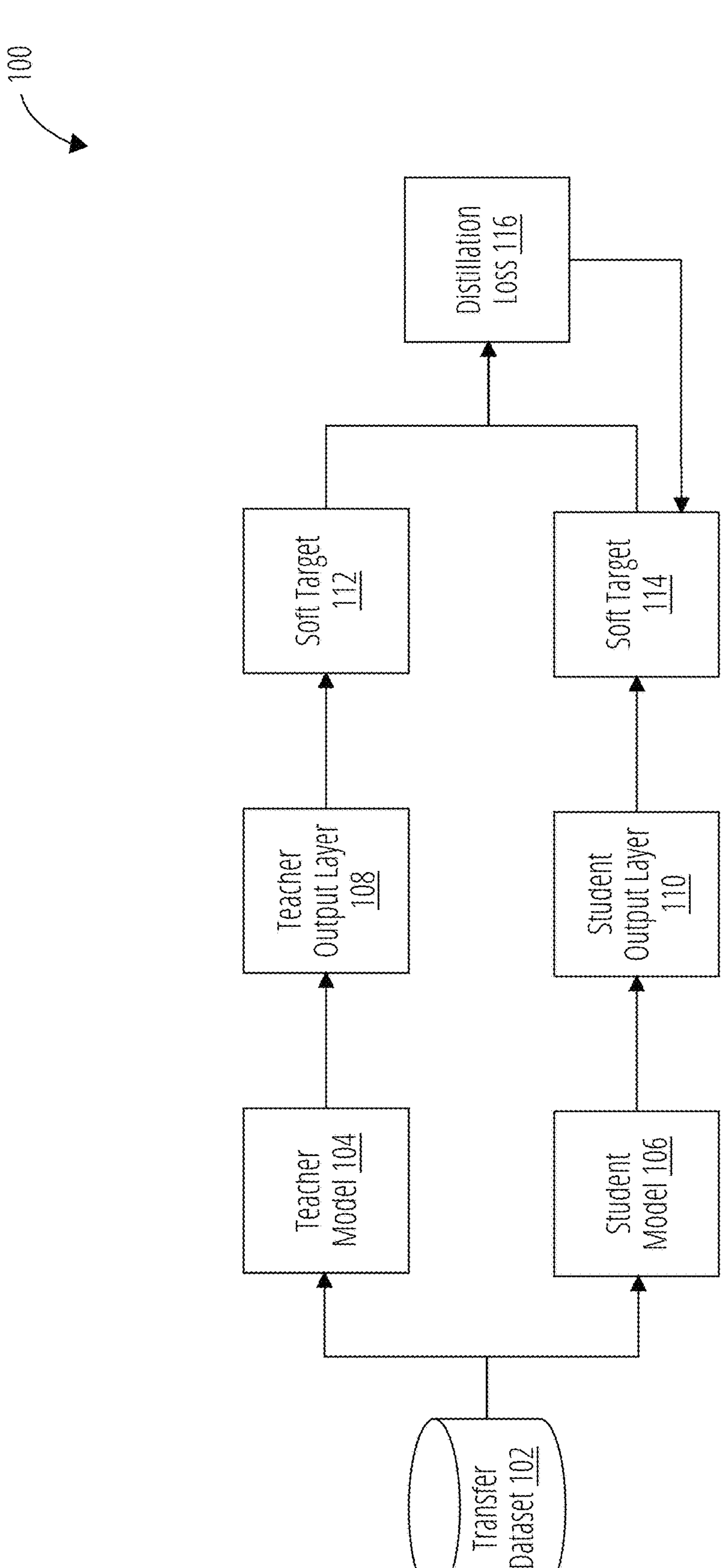
FIG. 1 illustrates a process for training a webpage classification model according to some embodiments.

The present disclosure provides a novel taxonomic webpage classification framework that alleviates shortcomings in the art, and provides novel mechanisms for performing scalable webpage classification and targeted content delivery.

In the embodiments, a webpage classification framework is provided that implements a transfer learning technique to train a class prediction model with a modified output layer that allows for multi-label classification of webpages.

In some embodiments, a training dataset can be created to train the class prediction model. In some embodiments, the training dataset can include human annotated webpages annotated with the taxonomic categories that are relevant to their content. In some embodiments, the training dataset can be created from documents in a corpus of documents, which can include but is not limited to websites. In some embodiments, where there is only limited labeled data, the training dataset can be populated using pre-trained language models. In some embodiments, to mitigate imbalanced class distribution in the training dataset a plurality of sampling techniques can be implemented to increase coverage for rare categories. In some embodiments, the sampling techniques can include random sampling. In some embodiments, the sampling techniques can include targeted sampling. In some embodiments, targeted sampling can include active learning whereby a classification or prediction model is trained with sparse data to detect URLs that may be relevant to a target category. In some embodiments, targeted sampling can include URL collection where human editors find URLs relevant to target categories.

In some embodiments, for English language webpages a training dataset can include a traffic based stratified sample of English language bid request URLs for a predetermined period of time (e.g., weeks or months). In some embodiments, the selected data can be labelled manually by a human. In some embodiments, where the selected data demonstrates a long tail category distribution, the targeted sampling approaches (e.g., URL collection and active learning) can be implemented to balance the data. In some embodiments, during URL collection a set of human reviewers is given a set of categories and asked to find candidate URLs from diverse websites that are relevant to those categories. In some embodiments, the candidate URLs can be fully annotated with respect to additional taxonomy categories to which they are relevant.

As noted, in some embodiments, targeted sampling can include active learning which uses model predictions to sample documents for annotation. In some embodiments, a dataset can be bootstrapped using URL Collection. Then, in some embodiments, initial models can be trained for tail and torso categories in the dataset. In some embodiments, to gather additional candidate pages for these rare categories, pages for which a model score is higher than a threshold can be sampled and then manually labelled by human reviewers.

In some embodiments, prediction models as discussed herein can be trained on and applied to documents in any language. In some embodiments, the corpus of documents and/or the training dataset can include documents in a plurality of languages (e.g., English, Spanish, French, Portuguese, Traditional Chinese, etc.). In some embodiments, non-English documents can be generated by translating English documents to the desired language or languages. In some embodiments, the translation can be accomplished using machine translation methods (e.g., Google Translate). In some embodiments, documents to be translated can be selected from the corpus through stratified random sampling, active learning, and/or URL Collection per language for each of non-English target language. In some embodiments, non-English documents to be included in the dataset are already translated and can be selected from the corpus through stratified random sampling, active learning and/or URL Collection per language for each of non-English target language. In some embodiments, non-English documents to be included in the dataset are in their original language and can be selected from the corpus through stratified random sampling, active learning and/or URL Collection per language for each of non-English target language. In some embodiments, non-English documents can be manually annotated by human reviewers.

In some embodiments, a corpus of documents can be partitioned per language or based on an intended use. For example, in some embodiments, the corpus of documents can be partitioned for each target language into a training dataset, a development dataset, and/or a test dataset. In some embodiments, the training dataset can include a mix of data sampled randomly, by URL Collection, and/or by active learning, as described. In some embodiments, the development dataset, can be used to make initial decisions on optimal hyperparameters and model selection via early stopping. In some embodiments, the development dataset can be a random subset of the stratified random sample of bid request URLs. In some embodiments, the test dataset can be a held-out dataset, which serves as a gatekeeper that determines whether a model meets a predetermined set of quality requirements and/or can be deployed to the field. In some embodiments, the test dataset can be a random subset of the stratified random sample. In some embodiments, a predictive model as described herein can be tested using a testing dataset. In some embodiments, the testing dataset can be generated through stratified random sampling of the training dataset or some other dataset.

In the embodiments, a method includes using knowledge distillation techniques where a teacher model trained on page content and URL text can be used to train a student model that is provided only a URL to make classification predictions. In some embodiments, the method can include establishing an association between URL tokens with categories in a taxonomy, so that URL tokens that are not clearly linked to a category (e.g., vox.com) can be predictive after distillation. In the embodiments, knowledge distillation can reduce inference latency by classifying web pages without first crawling them.

In the embodiments, a method can include a category-based re-weighting strategy that takes into account two aspects: the weight for positive labels, which can be sparse relative to negative labels, as well as the weight for infrequent categories, which are disadvantaged during training.

In the embodiments, a method can include training a multilingual classification model with data from websites in a plurality of languages, and use knowledge distillation (KD) techniques to reduce the computational cost of these models while achieving excellent classification accuracy in all languages.

In the embodiments, a method can adapting a transformer model to a multi-label classification model by modifying the output classification layer to include a sigmoid activation function.

In the embodiments, a method can include a class-based loss re-weighting technique. In the embodiments, a method can include one or more data sampling techniques to deal with label skew.

In the embodiments, a method can include a webpage classification model based on the text of the URL associated with the page. In the embodiments, the method can distill a large content-based classification model to a small URL-based classification model.

In the embodiments, a method can include preemptively and/or selectively crawl webpages and predict their categories off-line using a near real-time stream processing system.

Various details regarding the aforementioned embodiments are described herein. Further details on the embodiments is provided in Appendix A and that detail is not repeated herein in detail in its entirety.

FIG. 1 illustrates a knowledge distillation process for training a webpage classification model according to some embodiments.

Generally, the knowledge distillation Process 100 can include transferring the predictive capabilities of a teacher predictive model 104 to a student predictive model 106 (or webpage classification model as used herein). That is, in some embodiments, the predictions of a large model (the teacher) are used to train a lightweight distilled model (a student). Distillation can be accomplished using a variety of techniques and this disclosure is not limited to any particular technique.

In some embodiments, teacher model 104 can be a large model with much more parameters than student model 106.

In some embodiments, teacher model 104 can be trained with manually annotated binary labels using full web page content as input text.

According to embodiments, knowledge can be transferred from the teacher model 104 to the student model 106 using a transfer dataset 102. In some embodiments, transfer dataset 102 can be a dataset of unlabeled examples. In some embodiments, teacher model 104 can be a pre-trained model. In some embodiments, for a given a trained teacher model (e.g., teacher model 104) and an example $x_i$ (to be classified) from a transfer dataset (e.g., transfer dataset 102) dataset, the real-valued predictions $y_{i,c} \in [0,1]$ from the teacher model for each category c are recorded as soft labels (e.g., Soft Target 112) for training the student model. In some embodiments, these soft labels can communicate additional information to the student model about the richer teacher model and contribute to improved accuracy and generalization.

In some embodiments, a teacher model 104 can be the XLM-RoBERTa-Large model. In some embodiments, a student model 106 can be the XLM-RoBERTa-Base model.

According to some embodiments, Process 100 can include providing a same item (e.g., a webpage) from transfer dataset 102 to teacher model 104 and student model 106. In some embodiments, each of the models generate outputs that are then propagated through respective output layers, teacher output layer 108 and student output layer 110. As will be discussed in further detail below, teacher output layer 108 and student output layer 110 can be a sigmoid activation function. In some embodiments, a distillation loss 116 can be determined from the label or class predictions in output layers 108 and 110. In some embodiments, the distillation loss 116 can be used the Soft Targets 114 for the student model 106. In turn, in some embodiments, parameters or weights of the student model 106 can be updated based on the distillation loss 116 and/or the Soft Targets 114.

In some embodiments, output layers 108 and 110 can include sigmoid activation functions for each category, that allow output units to learn binary classifiers independently of other units, while all units share their input representation from preceding Transformer layers (e.g., of model 104 and/or model 106). In some embodiments, the teacher model 104 and student model 106 can use the same sigmoid activation function (e.g., output layers 108 and 110) but the student model 106 can apply a temperature scaling of 1. In some embodiments, for a given a single category c, a model (e.g., teacher model 104 and/or student model 106) can be trained as a standard binary classifier. In some embodiments, a binary cross-entropy loss (e.g., distillation loss 116) can be defined over all N training examples $x_1, \ldots, x_N$, where each $x_i$ has a corresponding binary label $y_{i,c} \in \{0, 1\}$ indicating whether it belongs to category c.

$$L_c = \frac{1}{N}\sum_{i=1}^{N} y_{i,c}\log\left(1-\hat{y}_{i,c}\right) + (1-y_{i,c})\log\hat{y}_{i,c} \tag{1}$$

where $y_{i,c} \in [0, 1]$ indicates the real-valued activation of the sigmoid corresponding to category c when $x_i$ is provided as input. In some embodiments, when training multiple categories simultaneously, category-specific weights $w_c$ can be used for one of the terms in the loss. In some embodiments, the final loss of the network can be a weighted average of N per-instance losses summed over all C categories.

$$L = \frac{1}{N}\sum_{c=1}^{C}\sum_{i=1}^{N} w_c \cdot y_{i,c}\log\left(1-\hat{y}_{i,c}\right) + (1-y_{i,c})\log\hat{y}_{i,c} \tag{2}$$

In some embodiments, in a hierarchical multi-label classification, many rare categories can have very few positive examples (e.g., occurrences in the data). Thus, in some embodiments, this imbalance, without re-weighting, could lead to rare classes will have very little influence on the loss. In some embodiments, the loss function can incorporate a separate binary cross entropy loss for every category as shown above in equation (2). In some embodiments, where these categories are negative (e.g., $y_{i,c}=0$), the loss may become dominated by the negative labels and the classifier may converge on a trivial classifier which makes negative predictions for all categories.

According to some embodiments, a re-weighting technique is provided that can allow for simultaneous balance of the loss between classes (e.g., the influence of rare classes can be amplified) and change of the global influence of positive versus negative labels. In some embodiments, for negative labels (e.g., $y_{i,c}=0$), the weight can be 1. In some embodiments, for positive labels a weighting function that increases the influence of rare classes and limits that of frequent classes is provided. In some embodiments, a smoothing factor that can control the amount of re-weighting that is applied can be used. For example, in some embodiments, the weight $w_c$ can be defined by equation (3), $$w_c = \mu\frac{\max_k f_k + \alpha}{f_c + \alpha} \tag{3}$$

where $f_c$ denotes the frequency of category c in the training data, $$f_c = \sum_{i=1}^{N} y_{i,c} \tag{4}$$

$\alpha$ determines the degree of class-based re-weighting, and $\mu$ is a constant multiplier that controls the overall influence of positive versus negative labels. As $\alpha$ approaches $\infty$, all categories will have the same $w_c$, and class-based weighting will not be in effect. In some embodiments, if $\alpha$ is 0, the loss will be perfectly balanced to ensure equal influence from each category. In some embodiments, $y_{i,c}$ in equations (2) and (4) can be real-valued and can lie within [0, 1]. In some embodiments, since the influence of $\alpha$ can be sensitive to the corpus size N, $\alpha$ can be computed as a function of N:

$$\alpha = \gamma \times N \tag{5}$$

where $\gamma$ is a scale-free smoothing factor that can be tuned.

Figure 2:
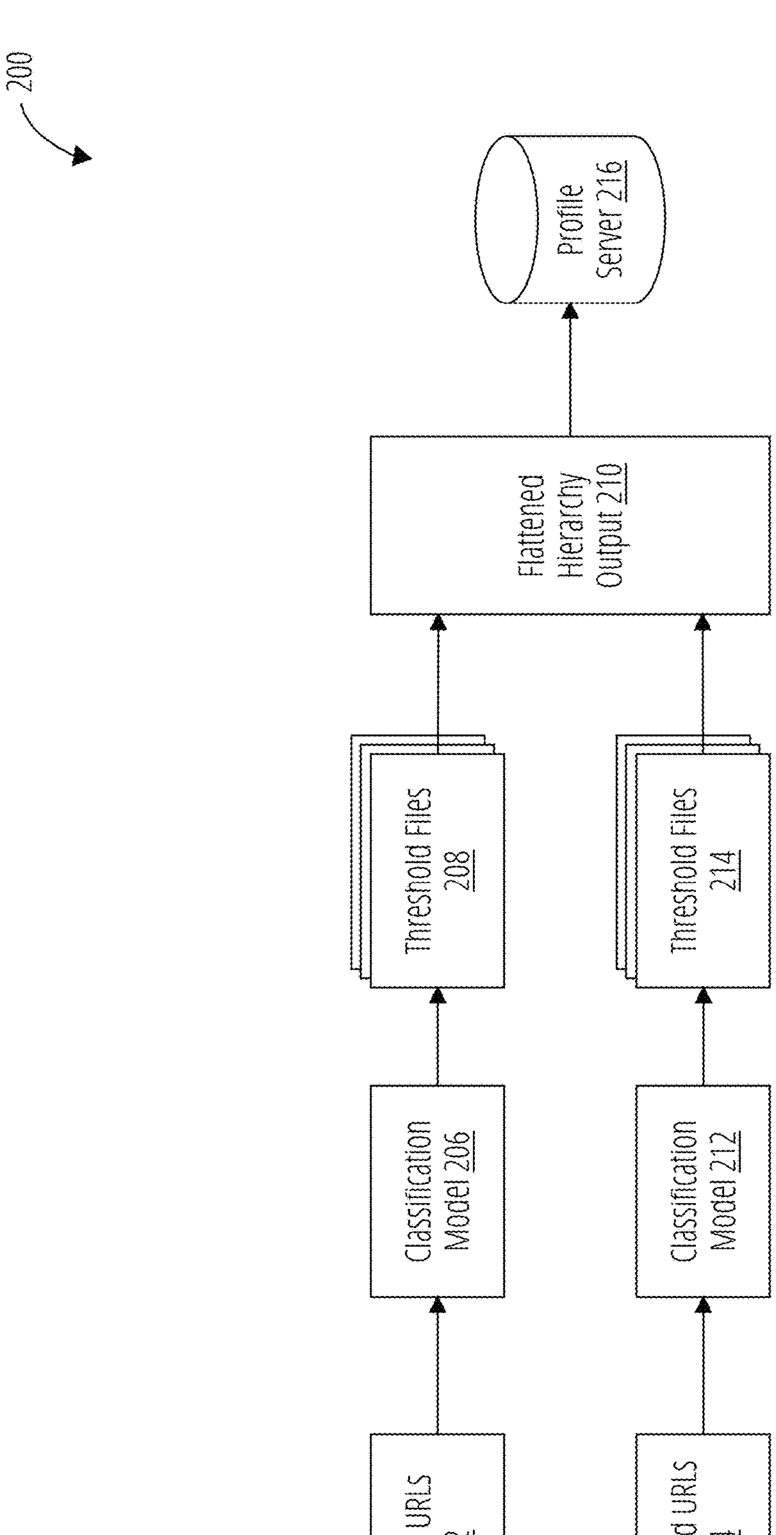
FIG. 2 illustrates a process for webpage classification and content delivery according to some embodiments.

FIG. 2 illustrates a process for webpage classification and content delivery according to some embodiments.

According to some embodiments, Process 200 implements classification model 206 and classification model 212 to provide classification prediction for crawled URLs 202 and uncrawled URLs 204, respectively.

In some embodiments, crawled URLs 202 refer to websites (denoted by their URLs) that have been crawled (e.g., analyzed to extract webpage content, index the webpage, or otherwise record the webpage and its contents). In some embodiments, crawled URLs 202 can include webpage data and/or content including but not limited to the webpage URL, media contained on the website, and website metadata. In some embodiments, uncrawled URLs 204 refer to webpages (denoted by their URLs) that have not been crawled (e.g., analyzed or indexed). In some embodiments, crawling a URL can include parsing the data in the URL and webpage content.

In some embodiments, classification model 206 can be a distilled or trained BERT, RoBERTa, DistilBERT, XLMRoBERTa-Large/-Base models, or a combination thereof. In some embodiments, classification model 206 can include an output layer with a sigmoid activation function. In some embodiments, classification model 206 can intake English and Non-English documents. In some embodiments, classification model 206 can take as inputs the domain, path, title, and/or body of a webpage. In some embodiments, classification model 206 can produce one or more threshold files 208 indicating class probabilities for each language for which class predictions are desired. In some embodiments, each threshold file can include the probability that a given URL meets a threshold for a given class.

In some embodiments, classification model 206 can take as inputs a sequence of "tokens." In some embodiments, classification model 206 can support two segments of input text separated by a "[sep]" token. In some embodiments, to classify a webpage given its URL, a classification model 206 can analyze the HyperText Markup Language (HTML) code corresponding to the website to extract a page title and body. In some embodiments, the page title and body can be extracted by stripping HTML tags, white space and/or special characters.

In some embodiments, the URL can be parsed and a domain and path can be extracted as tokens to be used as input to classification model 206. In some embodiments, the URL domain, path and page title can be designated as a first segment while the page body can constitute the second segment. In some embodiments, the information in URL domains (e.g., news.yahoo.com) and paths (e.g., /sports/football) can be used to determined one or more webpage categories.

In some embodiments, classification model 212 can be a distilled or trained BERT, RoBERTa, DistilBERT, XLMRoBERTa-Large/-Base models, or a combination thereof. In some embodiments, classification model 212 can include an output layer with a sigmoid activation function. In some embodiments, classification model 212 can intake English and Non-English documents. In some embodiments, classification model 212 can take as inputs the domain and/or path of a webpage. In some embodiments, classification model 212 can produce one or more threshold files 214 indicating class probabilities for each language for which class predictions are desired. In some embodiments, each threshold file can include the probability that a given URL meets a threshold for a given class.

In some embodiments, classification model 212 can take as inputs a sequence of "tokens." In some embodiments, classification model 212 can support two segments of input text separated by a "[sep] token". In some embodiments, to classify a webpage given its URL, the URL can be parsed and a domain and path can be extracted as tokens to be used as input to classification model 212. In some embodiments, the URL domain can be designated as a first segment while the path can constitute the second segment. In some embodiments, the information in URL domains (e.g., news.yahoo.com) and paths (e.g., /sports/football) can be used to determined one or more webpage categories.

In some embodiments, threshold files 208 and threshold files 214 are combined into a flattened hierarchy output 210. In some embodiments, Process 200 can include a flattened hierarchy output 210 for each language analyzed. In some embodiments, flattened hierarchy output 210 can include all identified documents in threshold files 208 and threshold files 214.

In some embodiments, flattened hierarchy output 210 can be provided to a profile server 216 to be used during a targeted content delivery process. In some of those embodiments, a content provider can bid on the opportunity to provide content to a webpage based on the webpage classification from flattened hierarchy output 210. In some embodiments, profile server 216 can include one or more URLs with one or more corresponding categories assigned by a classification model.

Figure 3:
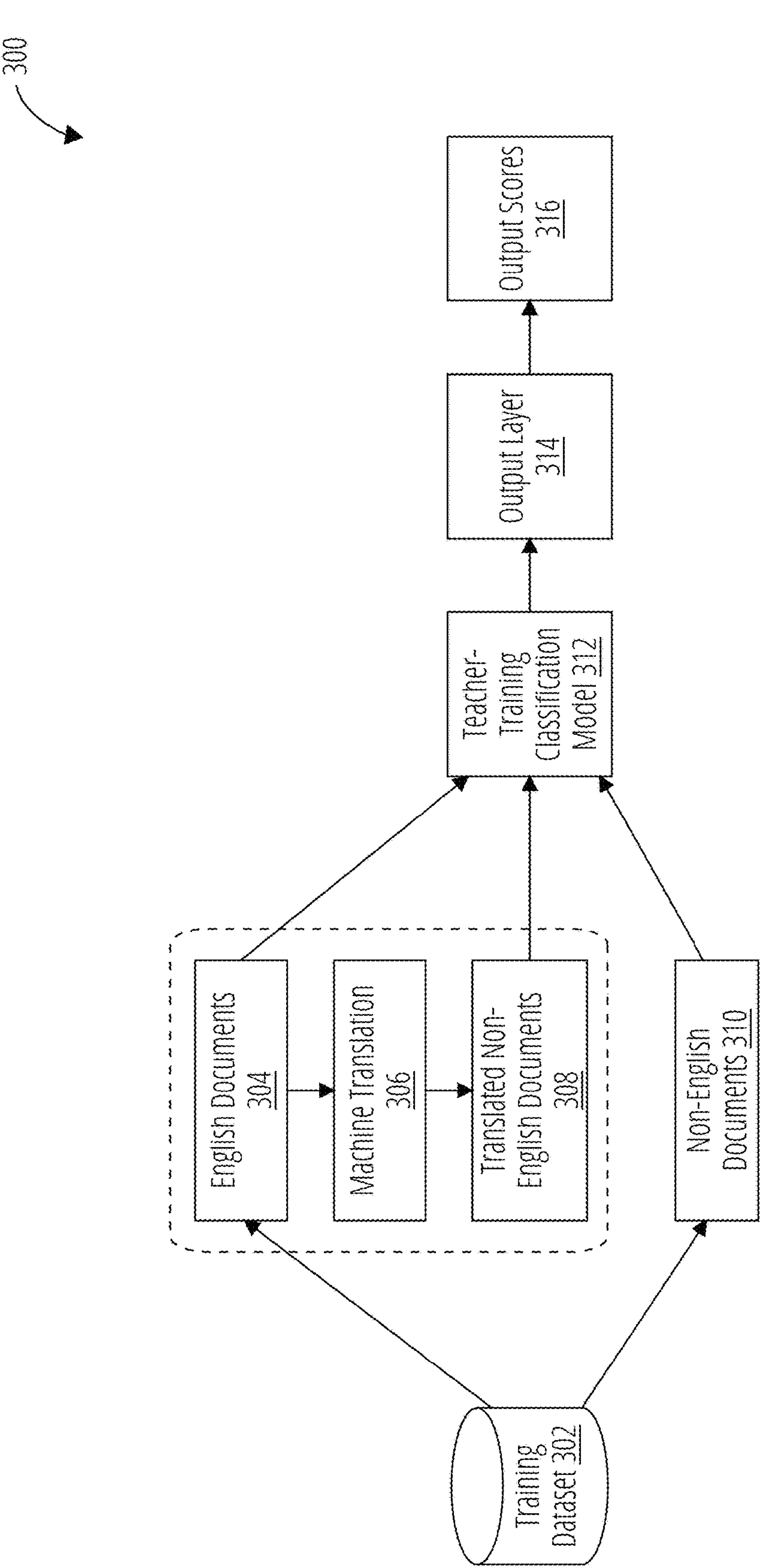
FIG. 3 illustrates a process for training a content-based teacher webpage classification model according to some embodiments.

FIG. 3 illustrates a process for training a teacher webpage classification model according to some embodiments.

According to some embodiments, Process 300 can obtaining documents from a training dataset 302. In some embodiments, 302 can include English documents 304 and non-English documents 310. In some embodiments, the documents in the training dataset 302 (e.g., English documents 304 and non-English documents 310) can be labeled documents that have been annotated by human reviewers. In some embodiments, a given document in training dataset 302 can include the URL, title, and body content of a webpage. In some embodiments, English documents 304 can be translated using machine translations 306 to generate non-English documents 308.

In some embodiments, teacher-training classification model 312 takes as inputs English documents 304, translated non-English Documents 308, and/or non-English documents 310. In some embodiments, teacher-training classification model 312 can take as inputs the URL, title, and body of a webpage. In some embodiments, teacher-training classification model 312 can take as input only the URL (e.g., domain and/or path). In some embodiments, teacher-training classification model 312 can be a BERT based classification model. In some embodiments, teacher-training classification model 312 can be the XLM-RoBERTa-Large classification model. In some embodiments, the output of teacher-training classification model 312 is provided to an output layer 314 to generate output scores 316.

In some embodiments, output layer 314 can be a sigmoid activation function. In some embodiments, output scores 316 can be sigmoid probability scores indicating a probability for each in a plurality of classes that a website falls within or is described by any given classification. According to some embodiments, during Process 300, the output scores 316 for any given document can be compared to the corresponding human annotated labels for the document and a loss can be calculated. Then, in some embodiments, teacher-training classification model 312 can be tuned (e.g., the parameters or weights of the model are updated) until teacher-training classification model 312 reaches a threshold accuracy and/or precision, or some other target metric. Once trained, teacher-training classification model 312 can be used to train other predictive models as described below.

Figure 4:
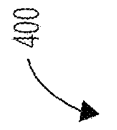
FIG. 4 illustrates a process for training a content-based student webpage classification model according to some embodiments.
Figure 4:
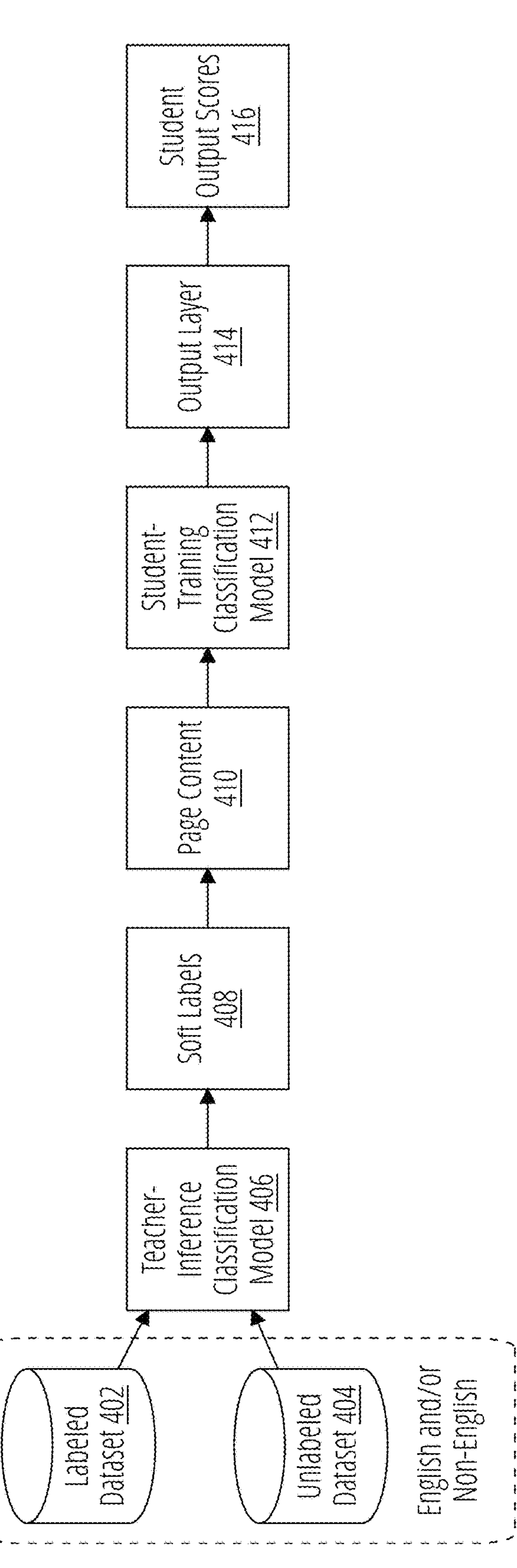

FIG. 4 illustrates a process for training a content-based student webpage classification model according to some embodiments.

According to some embodiments, in Process 400, a teacher-inference classification model 406 can be used to train a student-training classification model 412 (e.g., student model 106, classification model 206). In some embodiments, Process 400 can be generally described by Process 100 discussed in relation to FIG. 1. For clarity, Process 400 is described in relation to one document, however, it will be understood that Process 400 can be applied to a plurality of documents (e.g., in batches or as a stream).

In some embodiments, teacher-inference classification model 406 can take in as inputs documents from labeled dataset 402 and/or unlabeled dataset 404. In some embodiments, labeled dataset 402 can include English and non-English documents labeled by human reviewers. In some embodiments, unlabeled dataset 404 can include English and non-English documents that have not been labeled. In some embodiments, the input documents can include the URL, body, and/or text of the website being classified.

In some embodiments, teacher-inference classification model 406 generates soft labels 408 for the webpages being classified. Then, in some embodiments, the page content 410 can be provided to the student-training classification model 412. In some embodiments, page content 410 can include the webpage URL, title, and/or body. In some embodiments, student-training classification model 412 can be trained to classify crawled URLs. In some embodiments, the output of student-training classification model 412 can be provided to an output layer 414 to generate student output scores 416. In some embodiments, a distillation loss can be computed and the student-training classification model 412 be updated. In some embodiments, updating the student-training classification model 412 can include updating the output layer 414.

Figure 5:
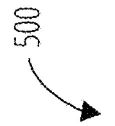
FIG. 5 illustrates a process for training a URL-based student webpage classification model according to some embodiments.
Figure 5:
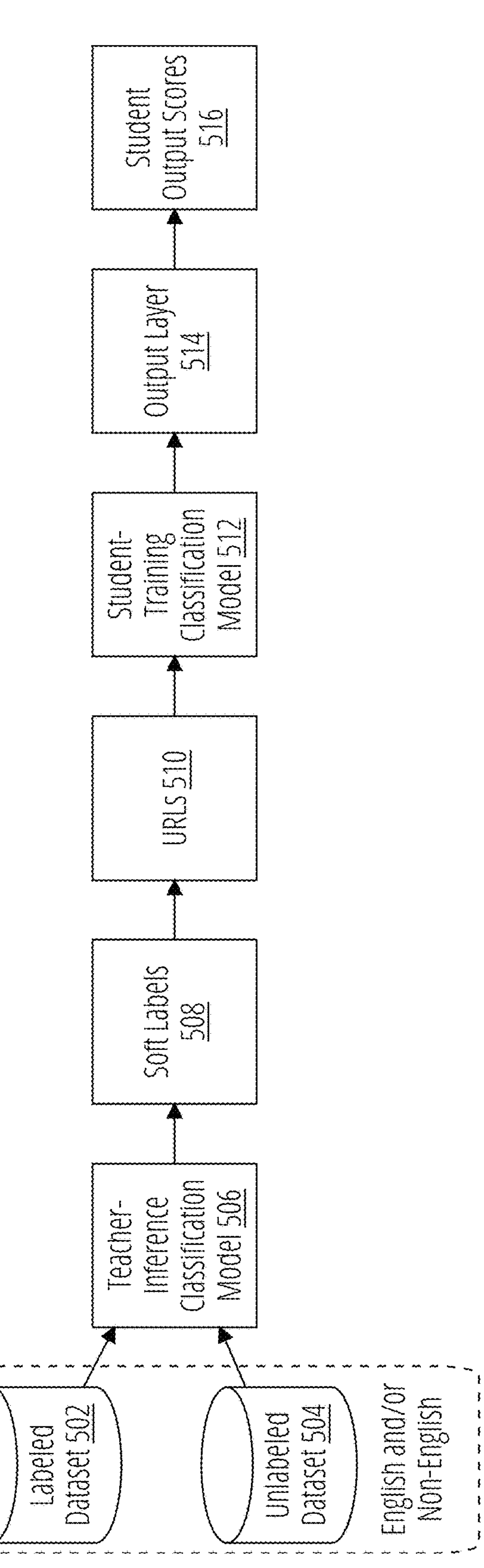

FIG. 5 illustrates a process for training a URL-based student webpage classification model according to some embodiments.

According to some embodiments, Process 500 can be similar to Process 400. However, Process 500 is different from Process 400 in that in Process 400 both the teacher-inference classification model 406 and the student-training classification model 412 are trained using webpage content (e.g., URL, title, and/or path), however, in Process 500, the teacher-inference classification model 506 is trained using webpage content but the student-training classification model 512 can be trained using only the webpage URL (e.g., URLs 510). That is, knowledge can be distilled and transferred by soft labels from the teacher model that trained with content to the student model that trained with URL.

According to some embodiments, in Process 500, a teacher-inference classification model 506 can used to train a student-training classification model 512 (e.g., student model 106, classification model 212). In some embodiments, Process 500 can be generally described by Process 100 discussed in relation to FIG. 1. For clarity, Process 500 is described in relation to one document, however, it will be understood that Process 500 can be applied to a plurality of documents (e.g., in batches or as a stream).

In some embodiments, teacher-inference classification model 506 can take in as inputs documents from labeled dataset 502 and/or unlabeled dataset 504. In some embodiments, labeled dataset 502 can include English and non-English documents labeled by human reviewers. In some embodiments, unlabeled dataset 504 can include English and non-English documents that have not been labeled. In some embodiments, the input documents can include the URL, body, and/or text of the website being classified.

In some embodiments, teacher-inference classification model 506 generates Soft labels 508 for the webpages being classified. Then, in some embodiments, the URLs 510 corresponding to the webpage being classified can be provided to the student-training classification model 512. In some embodiments, URLs 510 can include a domain and a path. In some embodiments, student-training classification model 512 can be trained to classify uncrawled URLs. In some embodiments, the output of student-training classification model 512 can be provided to an output layer 514 to generate student output scores 516. In some embodiments, a distillation loss can be computed and the student-training classification model 512 be updated. In some embodiments, updating the student-training classification model 512 can include updating the output layer 514.

Figure 6:
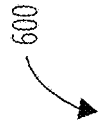
FIG. 6 illustrates a process for webpage classification and content delivery according to some embodiments.
Figure 6:
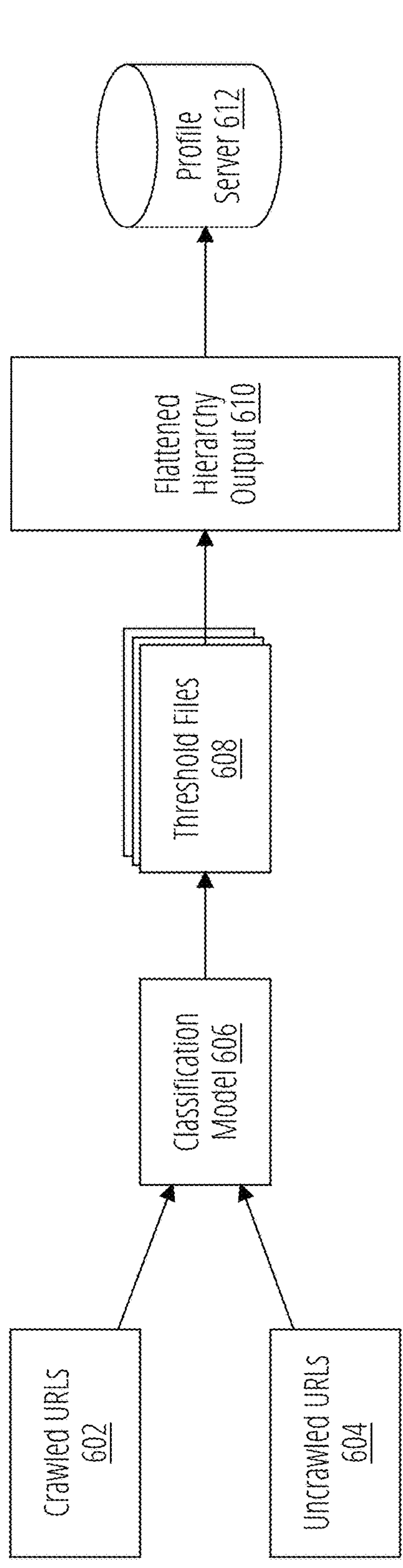

FIG. 6 illustrates a process for webpage classification and content delivery according to some embodiments.

According to some embodiments, Process 600 can be similar to Process 200. However, Process 600 is different from Process 200 in that in Process 600 a classification model 606 can generate class predictions for both crawled URLs 602 and uncrawled URLs 604.

In some embodiments, crawled URLs 602 refer to websites (denoted by their URLs) that have been crawled (e.g., analyzed to extract webpage content, index the webpage, or otherwise record the webpage and its contents). In some embodiments, crawled URLs 602 can include webpage data and/or content including but not limited to the webpage URL, media contained on the website, and website metadata. In some embodiments, uncrawled URLs 604 refer to webpages (denoted by their URLs) that have not been crawled (e.g., analyzed or indexed). In some embodiments, crawling a URL can include parsing the data in the URL and webpage content.

In some embodiments, classification model 606 can be a distilled or trained BERT, RoBERTa, DistilBERT, XLMRoBERTa-Large/-Base models, or a combination thereof. In some embodiments, classification model 606 can include an output layer with a sigmoid activation function. In some embodiments, classification model 606 can intake English and Non-English documents. In some embodiments, classification model 606 can take as inputs the domain, path, title, and/or body of a webpage. In some embodiments, classification model 606 can produce one or more threshold files 608 indicating class probabilities for each language for which class predictions are desired. In some embodiments, each threshold file can include the probability that a given URL meets a threshold for a given class.

In some embodiments, classification model 606 can take as inputs a sequence of "tokens." In some embodiments, classification model 606 can support two segments of input text separated by a "[sep] token". In some embodiments, to classify a webpage given its URL, a classification model 606 can analyze the HyperText Markup Language (HTML) code corresponding to the website to extract a page title and body. In some embodiments, the page title and body can be extracted by stripping HTML tags, white space and/or special characters.

In some embodiments, the URL can be parsed and a domain and path can be extracted as tokens to be used as input to classification model 606. In some embodiments, the URL domain, path and page title can be designated as a first segment while the page body can constitute the second segment. In some embodiments, the URL domain can be designated as a first segment while the path can constitute the second segment. In some embodiments, the first and second segments can be each have one or more of the URL, domain, path, title, and content. In some embodiments, the information in URL domains (e.g., news.yahoo.com) and paths (e.g., /sports/football) can be used to determined one or more webpage categories.

In some embodiments, threshold files 608 can be combined into a flattened hierarchy output 610. In some embodiments, Process 600 can include a flattened hierarchy output 610 for each language analyzed. In some embodiments, flattened hierarchy output 610 can include all identified documents in threshold files 608.

In some embodiments, flattened hierarchy output 610 can be provided to a profile server 612 to be used during a targeted content delivery process. In some of those embodiments, a content provider can bid on the opportunity to provide content to a webpage based on the webpage classification from flattened hierarchy output 610. In some embodiments, profile server 612 can include one or more URLs with one or more corresponding categories assigned by a classification model.

Figure 7:
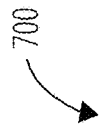
FIG. 7 illustrates a process for training a unified student webpage classification model according to some embodiments.
Figure 7:
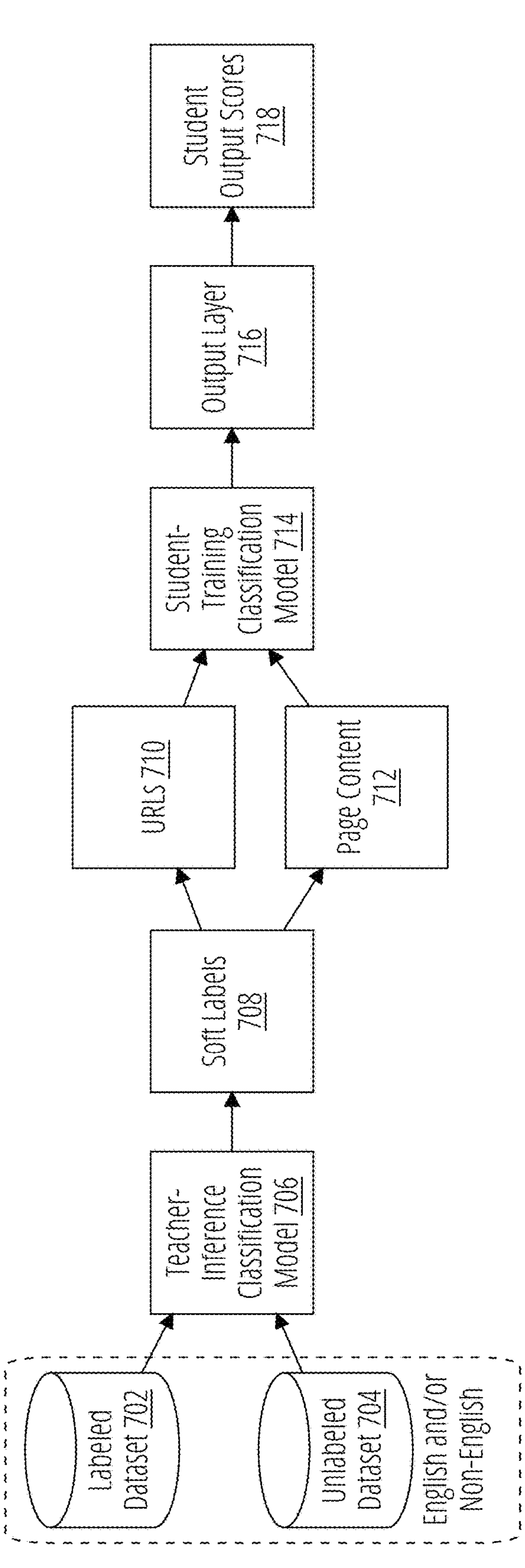

FIG. 7 illustrates a process for training a unified student webpage classification model according to some embodiments.

According to some embodiments, Process 700 can be a combination of Process 400 and Process 500. However, Process 700 is different from Process 400 and Process 500 in that in Process 700 the student-training classification model 714 can have alternative input representations (e.g., URLs 710 and page content 712) with the same soft labels (e.g., same sigmoid probability scores) from teacher-inference classification model 706 where teacher-inference classification model 706 is trained with full page content.

According to some embodiments, in Process 700, a teacher-inference classification model 706 can used to train a student-training classification model 714 (e.g., student model 106, classification model 606). In some embodiments, Process 700 can be generally described by Process 100 discussed in relation to FIG. 1. For clarity, Process 700 is described in relation to one document, however, it will be understood that Process 700 can be applied to a plurality of documents (e.g., in batches or as a stream).

In some embodiments, teacher-inference classification model 706 can take in as inputs documents from labeled dataset 702 and/or unlabeled dataset 704. In some embodiments, labeled dataset 702 can include English and non-English documents labeled by human reviewers. In some embodiments, unlabeled dataset 704 can include English and non-English documents that have not been labeled. In some embodiments, the input documents can include the URL, body, and/or text of the website being classified.

In some embodiments, teacher-inference classification model 706 generates soft labels 708 for the webpages being classified. Then, in some embodiments, the URLs 710 and/or page content 712 corresponding to the webpage being classified can be provided to the student-training classification model 714. In some embodiments, URLs 710 can include a domain and a path. In some embodiments, page content 712 can include the webpage URL, title, and/or body. In some embodiments, student-training classification model 714 can be trained to classify crawled URLs. In some embodiments, student-training classification model 714 can be trained to classify uncrawled URLs. In some embodiments, the output of student-training classification model 714 can be provided to an output layer 716 to generate student output scores 718. In some embodiments, a distillation loss can be computed and the student-training classification model 714 be updated. In some embodiments, updating the student-training classification model 714 can include updating the output layer 716.

In some embodiments, student-training classification model 714 can be simultaneously trained with two soft labels 708 sets but with the same sigmoid probability scores from a teacher-inference classification model 706 trained with full page content. In some embodiments, one soft labels 708 can include soft labels with crawled full page content. In some embodiments, the other soft labels 708 can be the same soft label but with URL text only. In some embodiments, Process 700, a prefix token can be added to identify if the training sample is from crawled page content or URL text only.

Figure 8:
FIG. 8 is a flow diagram illustrating for webpage classification according to some embodiments.
Figure 8:
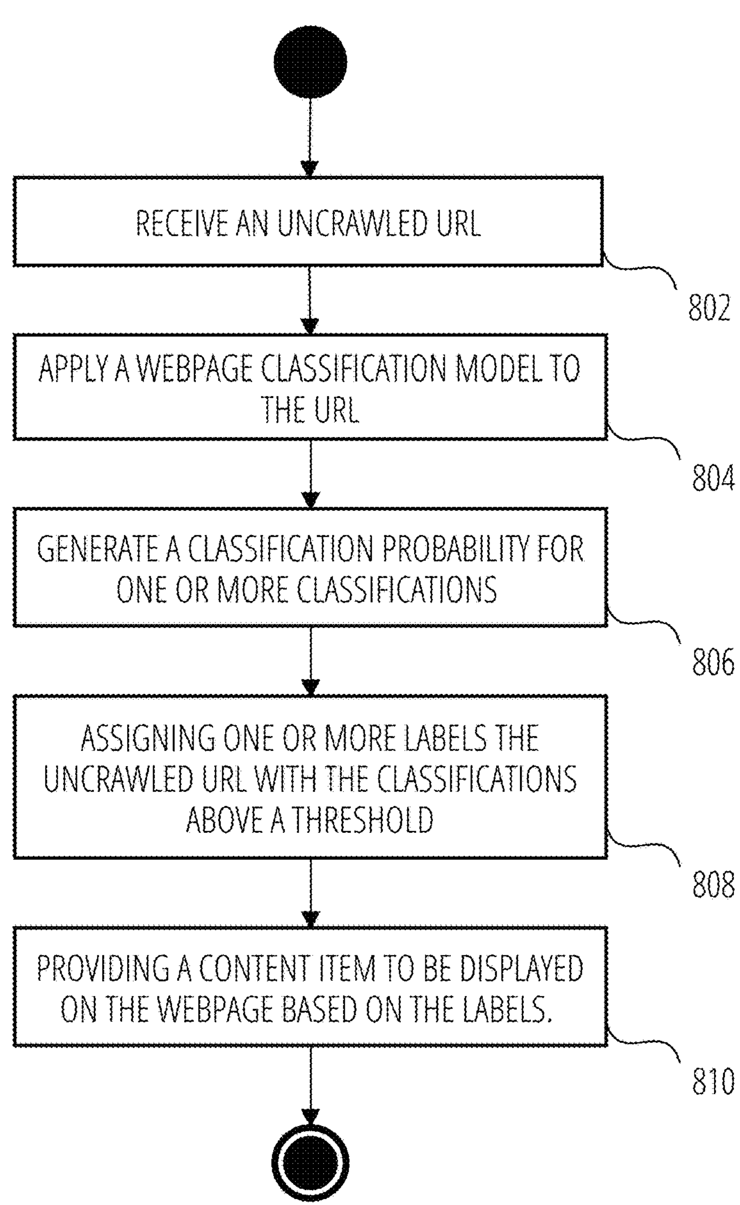

FIG. 8 is a flow diagram illustrating for webpage classification according to some embodiments.

In Step 802, Method 800 can include receiving an uncrawled URL (e.g., uncrawled URLs 204 or crawled URLs 602) corresponding to a webpage. In some embodiments, uncrawled URLs 204 refer to webpages (denoted by their URLs) that have not been crawled (e.g., analyzed or indexed). In some embodiments, crawling a URL can include parsing the data in the URL and webpage content.

In Step 804, Method 800 can include applying a webpage classification model (e.g., classification model 212, student-training classification model 512, student-training classification model 714) to the uncrawled URL. In some embodiments, the classification model receives as input a domain and/or a path of the web URL. In some embodiments, the webpage classification model can include an output layer with including a sigmoid activation function.

In Step 806, Method 800 can include generating a classification probability for one or more classifications related to the webpage. In some embodiments, a classification is part of a classification hierarchy.

In Step 808, Method 800 can include labeling the uncrawled webpage with one or more classifications that meet a threshold. For example, in some embodiments, the uncrawled webpage can be labeled with every classification above an arbitrary threshold (e.g., 50% or top 10). In some embodiments, the uncrawled webpage can be labeled with every classification within a subset of the classifications.

In Step 810, Method 800 can include providing a content item to be displayed on the webpage based on the labels selected in Step 808. In some embodiments, the content item can be a content item provided by a content creator. In some embodiments, the content creator can select or bid on which pages to target based on their labels.

Figure 9:
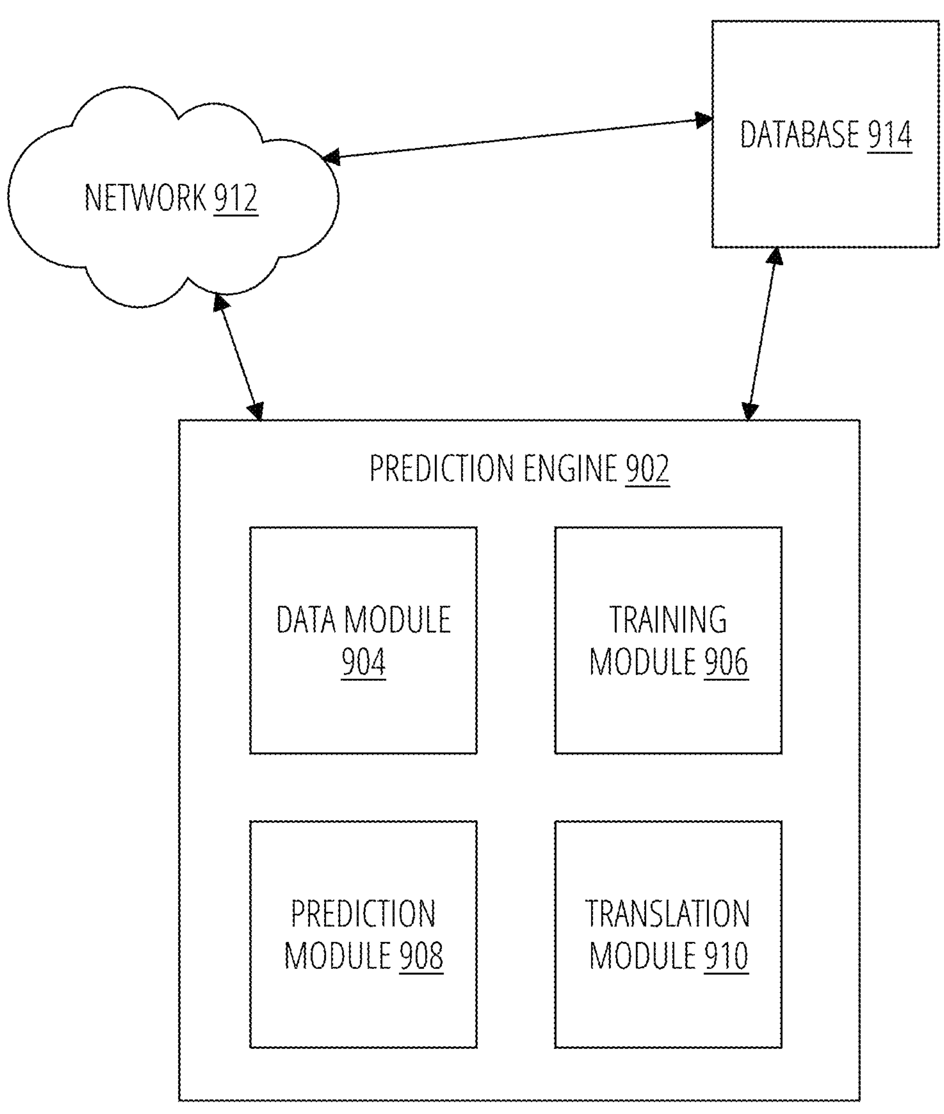
FIG. 9 is a block diagram illustrating components of an exemplary system according to some embodiments.

FIG. 9 is a block diagram illustrating components of an exemplary system according to some embodiments.

FIG. 9 illustrates components that can be used for performing the systems and methods discussed herein. However, not all components may be used. FIG. 9 includes prediction engine 902, network 912, and database 914. In some embodiments, the prediction engine 902 can be a special purpose machine or processor and could be hosted by a cloud server (e.g., cloud web services server(s)), application server, content server, web server, search server, content provider, third party server, user's computing device, and the like, or any combination thereof.

According to some embodiments, prediction engine 902 can be a stand-alone application that executes on a device (e.g., device 1100). In some embodiments, prediction engine 902 can function as an application installed on the device, and in some embodiments, such application can be a web-based application accessed by the device over a network. In some embodiments, portions of the prediction engine 902 function as an application installed on the device and some other portions can be cloud-based or web-based applications accessed by the device over a network, where the several portions of the prediction engine 902 exchange information over the network. In some embodiments, the prediction engine 902 can be installed as an augmenting script, program or application (e.g., a plug-in or extension) to another application or portable data structure.

Figure 10:
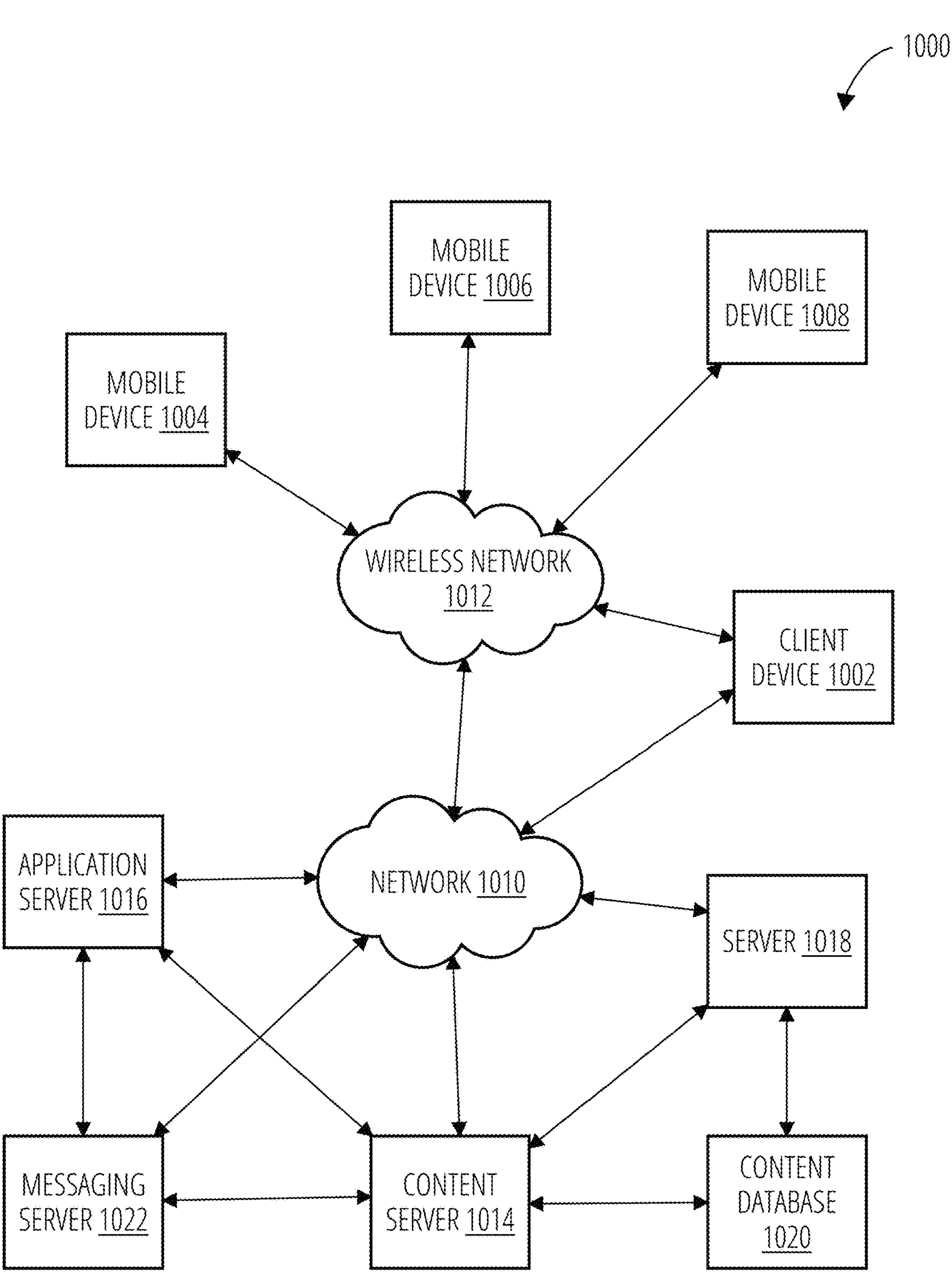
FIG. 10 is a block diagram illustrating an example of a network within which the systems and methods disclosed herein could be implemented according to some embodiments.
Figure 11:
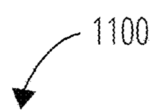
FIG. 11 is a block diagram of a device according to some embodiments.
Figure 11:
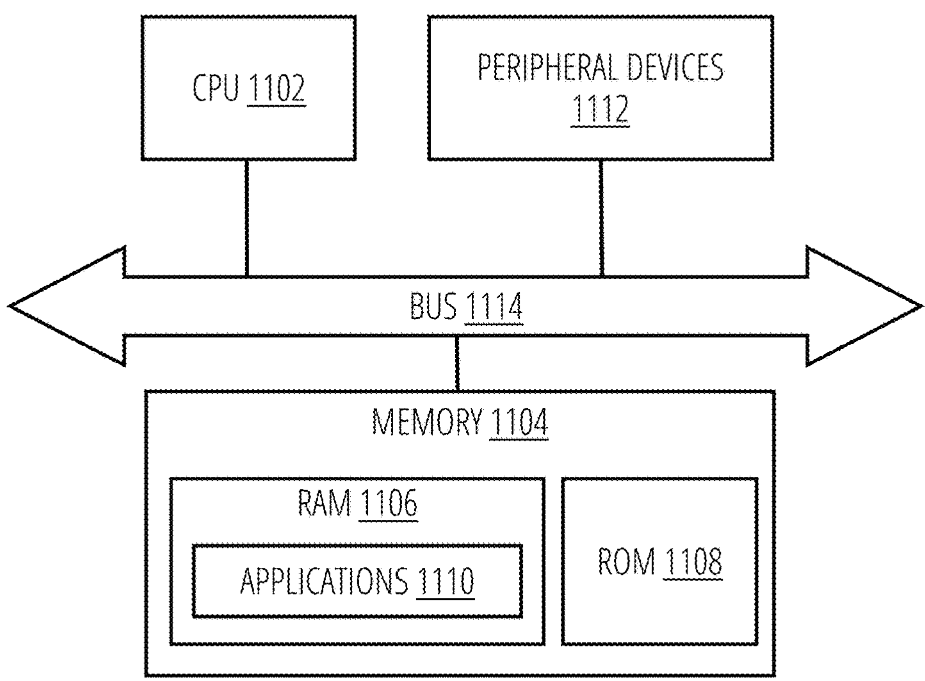

The database 914 can be any type of database or memory, and can be associated with a content server on a network (e.g., content server, a search server or application server) or a device (e.g., client device 1002-1008 or device 1100 from FIG. 10 and FIG. 11, respectively). In some embodiments, database 914 can include a dataset of data and metadata associated with local and/or network information related to users, services, applications, content and the like. In some embodiments, database 914 includes a dataset of data and metadata corresponding to webpages in a content delivery or search service. In some embodiments, database 914 can include a corpus of webpages containing a large number of webpages. In some embodiments, database 914 can include a corpus of webpages containing a large number of webpages limited by a temporal threshold (e.g., 10 million webpages corresponding to the last 7 days).

In some embodiments, such information can be stored and indexed in the database 914 independently and/or as a linked or associated dataset. As discussed above, it should be understood that the data (and metadata) in the database 914 can be any type of information and type, whether known or to be known, without departing from the scope of the present disclosure. In some embodiments, datasets as discussed herein can be stored in or embodied by database 914.

According to some embodiments, database 914 can store data for users, e.g., user data. According to some embodiments, the stored user data can include, but is not limited to, information associated with a user's profile, user interests, user behavioral information, user patterns, user attributes, user preferences or settings, user messages, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 914 can be any type of information related to a user, webpage, content, a device, an application, a service provider, a content provider, whether known or to be known, without departing from the scope of the present disclosure.

According to some embodiments, database 914 can store data and metadata associated with users, messages, images, videos, text, products, items and services from an assortment of media, applications and/or service providers and/or platforms, and the like. Accordingly, any other type of known or to be known attribute or feature associated with a webpage, data item, media item, login, logout, website, application, communication (e.g., a message) and/or its transmission over a network, a user and/or content included therein, or some combination thereof, can be saved as part of the data/metadata in datastore 914.

As discussed above, with reference to FIG. 10, the network 912 can be any type of network such as, but not limited to, a wireless network, a local area network (LAN), wide area network (WAN), the Internet, or a combination thereof. The network 912 facilitates connectivity of the prediction engine 902, and database 914. Indeed, as illustrated in FIG. 9, the prediction engine 902 and database 914 can be directly connected by any known or to be known method of connecting and/or enabling communication between such devices and resources.

The principal processor, server, or combination of devices that comprise hardware programmed in accordance with the special purpose functions herein is referred to for convenience as prediction engine 902, and includes data module 904, training module 906, prediction module 908, and translation module 910. In some embodiments, data module 904 can process and analyze webpages as discussed herein. In some embodiments, training module 906 can train webpage prediction models as discussed herein. In some embodiments, prediction module 908 can include prediction models as discussed herein. In some embodiments, translation module 910 can provide translation services as discussed herein.

It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

FIG. 10 is a block diagram illustrating an example of an environment within which the systems and methods disclosed herein could be implemented according to some embodiments.

FIG. 10 shows components of a general environment in which the systems and methods discussed herein may be practiced. Not all the components may be required to practice the disclosure, and variations in the arrangement and type of the components may be made without departing from the spirit or scope of the disclosure.

FIG. 10 illustrates a system 1000 in accordance with an embodiment of the present disclosure is shown. As shown, system 1000 can include local area networks ("LANs")/wide area networks ("WANs")—network 1010, wireless network 1012, mobile devices (client device) 1004-1008 and client device 1002. System 1000 can also include a variety of servers, such as content server 1014, application ("App") server 1016, and third party servers 1018.

One embodiment of mobile devices 1004-1008 is described in more detail below. Generally, however, mobile devices 1004-1008 can include virtually any portable computing device capable of receiving and sending a message over a network, such as network 1010, wireless network 1012, or the like. In some embodiments, mobile devices 1004-1008 can also be described generally as client devices that are configured to be portable.

Mobile devices 1004-1008 can also include at least one client application that is configured to receive content from another computing device. In some embodiments, the client application can include a capability to provide and receive textual content, graphical content, audio content, and the like. In some embodiments, the client application can further provide information that identifies itself, including a type, capability, name, and the like. In one embodiment, mobile devices 1004-1008 may uniquely identify themselves through any of a variety of mechanisms, including a phone number, Mobile Identification Number (MIN), an electronic serial number (ESN), or other mobile device identifier.

In some embodiments, mobile devices 1004-1008 can also communicate with non-mobile client devices, such as client device 1002, or the like. In some embodiments, client device 1002 may include virtually any computing device capable of communicating over a network to send and receive information.

In some embodiments, devices 1002-1008 can be referred to as computing devices. Devices 1002-1008 may be capable of sending or receiving signals, such as via a wired or wireless network, or may be capable of processing or storing signals, such as in memory as physical memory states, and may, therefore, operate as a server. Computing devices may, for example, include portable, non-portable, and wearable devices (e.g., desktop computers, cellular phones, smart watches, and tablets).

Wireless network 1012 can be configured to couple mobile devices 1004-1008 and its components with network 1010. Wireless network 1012 can include any of a variety of wireless sub-networks that may further overlay stand-alone ad-hoc networks, and the like, to provide an infrastructure-oriented connection for mobile devices 1004-1008. Such sub networks can include mesh networks, Wireless LAN (WLAN) networks, cellular networks, and the like. In some embodiments, a wireless network may include virtually any type of wireless communication mechanism by which signals may be communicated between computing devices.

Network 1010 is configured to couple content server 1014, App server 1016, or the like, with other computing devices, including, client device 1002, and through wireless network 1012 to mobile devices 1004-1008. Network 1010 is enabled to employ any form of computer readable media or network for communicating information from one electronic device to another. Also, network 1010 can include the Internet in addition to local area networks (LANs), wide area networks (WANs), or direct connections. According to some embodiments, a "network" should be understood to refer to a network that may couple devices so that communications may be exchanged (e.g., between a server and a client device) including between wireless devices coupled via a wireless network, for example. A network may also include mass storage or other forms of computer or machine readable media, for example.

In some embodiments, the disclosed networks 1010 and/or 1012 can comprise a content distribution network(s). A "content delivery network" or "content distribution network" (CDN) generally refers to a distributed content delivery system that comprises a collection of computers or computing devices linked by a network or networks.

In some embodiments, the content server 1014 can include a device that includes a configuration to provide any type or form of content via a network to another device. Content server 1014 can further provide a variety of services that include, but are not limited to, email services, instant messaging (IM) services, streaming and/or downloading media services, search services, photo services, web services, social networking services, news services, third-party services, audio services, video services, mobile application services, or the like. Such services, for can be provided via the App server 1016, whereby a user is able to utilize such service upon the user being authenticated, verified or identified by the service. In some embodiments, content server 1014, App server 1016, and third-party server 1018 can store, obtain, retrieve, or provide interactive content and/or interactive content data as discussed herein.

Servers 1014, 1016, and 1018 may be capable of sending or receiving signals, such as via a wired or wireless network, or may be capable of processing or storing signals, such as in memory as physical memory states. According to some embodiments, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 1014, 1016, and/or 1018 via the network 1010 and/or wireless network 1012 using their various devices 1002-1008.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the App server 1016, content server 1014, and the like.

Thus, the App server 1016, for example, can store various types of applications and application related information including application data and user profile information (e.g., identifying and behavioral information associated with a user). It should also be understood that content server 1014 can also store various types of data related to the content and services provided by content server 1014 in an associated content database 1020, as discussed in more detail below.

Third party server 1018 (in some embodiments, an "ad server") can comprise a server that stores online advertisements for presentation to users. "Ad serving" refers to methods used to place online advertisements on websites, in applications, or other places where users are more likely to see them, such as during an online session or during computing platform use, for example. In some embodiments, Server 1018 can incorporate near instantaneous auctions of ad placement opportunities during web page creation.

Moreover, although FIG. 10 illustrates servers 1014, 1016, and 1018 as single computing devices, respectively, the disclosure is not so limited. For example, one or more functions of servers 1014, 1016, and/or 1018 can be distributed across one or more distinct computing devices. Moreover, in one embodiment, servers 1014, 1016, and/or 1018 can be integrated into a single computing device, without departing from the scope of the present disclosure.

FIG. 11 is a block diagram of a device according to some embodiments.

As illustrated, the device 1100 can include a processor or central processing unit (CPU) such as CPU 1102 in communication with a memory 1104 via a bus 1114. The device can also include one or more input/output (I/O) or peripheral devices 1112. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 1102 can comprise a general-purpose CPU. The CPU 1102 can comprise a single-core or multiple-core CPU. The CPU 1102 can comprise a system-on-a-chip (SoC) or a similar embedded system. In some embodiments, a graphics processing unit (GPU) can be used in place of, or in combination with, a CPU 1102. Memory 1104 can comprise a non-transitory memory system including a dynamic random-access memory (DRAM), static random-access memory (SRAM), Flash (e.g., NAND Flash), or combinations thereof. In one embodiment, the bus 1114 can comprise a Peripheral Component Interconnect Express (PCIe) bus. In some embodiments, bus 1114 can comprise multiple busses instead of a single bus.

Memory 1104 illustrates an example of non-transitory computer storage media for the storage of information such as computer-readable instructions, data structures, program modules, or other data. Memory 1104 can store a basic input/output system (BIOS) in read-only memory (ROM), such as ROM 1108, for controlling the low-level operation of the device. The memory can also store an operating system in random-access memory (RAM) for controlling the operation of the device Applications 1110 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 1106 by CPU 1102. CPU 1102 may then read the software or data from RAM 1106, process them, and store them in RAM 1106 again.

The device 1100 can optionally communicate with a base station (not shown) or directly with another computing device. One or more network interfaces in peripheral devices 1112 are sometimes referred to as a transceiver, transceiving device, or network interface card (NIC).

An audio interface in Peripheral devices 1112 produces and receives audio signals such as the sound of a human voice. For example, an audio interface may be coupled to a speaker and microphone (not shown) to enable telecommunication with others or generate an audio acknowledgment for some action. Displays in Peripheral devices 1112 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 1112 can comprise any input device arranged to receive input from a user. An illuminator in peripheral devices 1112 can provide a status indication or provide light. The device can also comprise an input/output interface in peripheral devices 1112 for communication with external devices, using communication technologies, such as USB, infrared, Bluetooth™, or the like. A haptic interface in peripheral devices 1112 can provide a tactile feedback to a user of the client device.

A GPS receiver in peripheral devices 1112 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 11, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, by a device, information related to an uncrawled uniform resource locator (URL) for a webpage, the uncrawled URL being a URL for the webpage that has not been previously analyzed or indexed;

applying, by the device, a webpage classification model to the uncrawled URL information, and determining, based on the application of the webpage classification model, a probability for a plurality of webpage classifications, the webpage classification model being a student model trained via knowledge distillation using a set of URLs and associated soft labels output by a teacher model, the teacher model being trained on URLs and associated page content for a set of webpages;

analyzing, by the device, the plurality of webpage classifications, and identifying, based at least in part on the determined probability for each of the plurality of webpage classifications, a set of webpage classifications;

assigning, by the device, a set of labels to the uncrawled URL corresponding to the set of webpage classifications; and providing, by the device, without crawling the webpage, a content item to be displayed on the webpage based on the assigned labels.

2. The method of claim 1, further comprising:

analyzing the set of webpage classifications; and determining, based on the analysis of the set of webpage classifications, a set of categories, at least one of the set of webpage classifications corresponding to each category.

3. The method of claim 2, further comprising:

identifying, based on the analysis of the plurality of webpage classifications, a category from the set of categories; and assigning a categorical label to the uncrawled URL.

4. The method of claim 1, further comprising:

receiving, over a network, the content item from a content creator; and identifying, based on the assigned labels, the webpage, wherein the providing of the content item is based on the identification of the webpage via the assigned labels.

5. The method of claim 4, further comprising:

analyzing content of the content item, and determining the content to correspond to content of the webpage based on the assigned labels.

6. The method of claim 1, wherein the uncrawled URL information comprises data related to at least one of the URL and content of the webpage, the data for the URL corresponding to a domain and path of the URL.

7. The method of claim 1, wherein the identified set of webpage classifications each have a probability value at or above a threshold.

8. The method of claim 1, wherein the assignment of the set of labels occurs off-line.

9. The method of claim 1, wherein the webpage classification model is a type of model that corresponds to a type of the webpage.

10. The method of claim 1, wherein the set of labels correspond to layers of the webpage classification model.

11. A non-transitory computer-readable storage medium tangibly storing thereon computer-executable instructions that when executed by a device, cause the device to perform a method comprising:

receiving, by the device, information related to an uncrawled uniform resource locator (URL) for a webpage, the uncrawled URL being a URL for the webpage that has not been previously analyzed or indexed;

applying, by the device, a webpage classification model to the uncrawled URL information, and determining, based on the application of the webpage classification model, a probability for a plurality of webpage classifications, the webpage classification model being a student model trained via knowledge distillation using a set of URLs and associated soft labels output by a teacher model, the teacher model being trained on URLs and associated page content for a set of webpages;

analyzing, by the device, the plurality of webpage classifications, and identifying, based at least in part on the determined probability for each of the plurality of webpage classifications, a set of webpage classifications;

assigning, by the device, a set of labels to the uncrawled URL corresponding to the set of webpage classifications; and providing, by the device, without crawling the webpage, a content item to be displayed on the webpage based on the assigned labels.

12. The non-transitory computer-readable storage medium of claim 11, further comprising:

analyzing the set of webpage classifications; and determining, based on the analysis of the set of webpage classifications, a set of categories, at least one of the set of webpage classifications corresponding to each category.

13. The non-transitory computer-readable storage medium of claim 12, further comprising:

identifying, based on the analysis of the plurality of webpage classifications, a category from the set of categories; and assigning a categorical label to the uncrawled URL.

14. The non-transitory computer-readable storage medium of claim 11, further comprising:

receiving, over a network, the content item from a content creator;

analyzing content of the content item, and determining the content to correspond to content of the webpage based on the assigned labels; and identifying, based on the assigned labels, the webpage, wherein the providing of the content item is based on the identification of the webpage via the assigned labels.

15. The non-transitory computer-readable storage medium of claim 11, wherein the uncrawled URL information comprises data related to at least one of the URL and content of the webpage, the data for the URL corresponding to a domain and path of the URL.

16. A device comprising:

a processor configured to:

receive information related to an uncrawled uniform resource locator (URL) for a webpage, the uncrawled URL being a URL for the webpage that has not been previously analyzed or indexed;

apply a webpage classification model to the uncrawled URL information, and determine, based on the application of the webpage classification model, a probability for a plurality of webpage classifications, the webpage classification model being a student model trained via knowledge distillation using a set of URLs and associated soft labels output by a teacher model, the teacher model being trained on URLs and associated page content for a set of webpages;

analyze the plurality of webpage classifications, and identify, based at least in part on the determined probability for each of the plurality of webpage classifications, a set of webpage classifications;

assign a set of labels to the uncrawled URL corresponding to the set of webpage classifications; and provide, without crawling the webpage, a content item to be displayed on the webpage based on the assigned labels.

17. The device of claim 16, wherein the processor is further configured to:

analyze the set of webpage classifications; and determine, based on the analysis of the set of webpage classifications, a set of categories, at least one of the set of webpage classifications corresponding to each category.

18. The device of claim 17, wherein the processor is further configured to:

identify, based on the analysis of the plurality of webpage classifications, a category from the set of categories; and assign a categorical label to the uncrawled URL.

19. The device of claim 16, wherein the processor is further configured to:

receive, over a network, the content item from a content creator;

analyze content of the content item, and determining the content to correspond to content of the webpage based on the assigned labels; and identify, based on the assigned labels, the webpage, wherein the providing of the content item is based on the identification of the webpage via the assigned labels.

20. The device of claim 16, wherein the uncrawled URL information comprises data related to at least one of the URL and content of the webpage, the data for the URL corresponding to a domain and path of the URL.

* * * * *